United States Patent [19]

Streiff

[11] Patent Number: 4,497,753
[45] Date of Patent: Feb. 5, 1985

[54] CORRUGATED SHEET PACKING AND METHOD OF MAKING

[75] Inventor: Felix Streiff, Winterthur, Switzerland

[73] Assignee: Sulzer Brothers Limited, Winterthur, Switzerland

[21] Appl. No.: 397,775

[22] Filed: Jul. 13, 1982

[30] Foreign Application Priority Data

Jul. 30, 1981 [CH] Switzerland .......................... 4925/81

[51] Int. Cl.³ .............................................. B01F 3/04
[52] U.S. Cl. ................................... 261/95; 29/163.5 R; 55/240; 165/60; 261/112; 261/DIG. 72; 264/286; 366/337; 428/181; 428/182; 428/597
[58] Field of Search ........................... 261/94–98, 261/108, 112, 113, DIG. 72; 55/90, 240, 233, 241; 210/150; 202/158; 422/310; D23/3, 4; 29/157.3 D, 163.5 R; 428/176, 597, 181–185, 604; 165/166, 60; 366/336, 337, 338, 340; 264/249, 285–287

[56] References Cited

U.S. PATENT DOCUMENTS

| | | | |
|---|---|---|---|
| 1,296,272 | 3/1919 | Doble | 428/597 X |
| 2,885,195 | 5/1959 | Haselden | 261/112 |
| 2,983,495 | 5/1961 | Shuttleworth | 261/112 |
| 3,272,484 | 9/1966 | Brand et al. | 261/112 X |
| 4,107,241 | 8/1978 | Braun | 261/112 X |

FOREIGN PATENT DOCUMENTS

| | | | |
|---|---|---|---|
| 82457 | 12/1971 | German Democratic Rep. | 261/98 |
| 147213 | 4/1921 | United Kingdom | 261/95 |
| 342040 | 7/1972 | U.S.S.R. | 261/112 |

*Primary Examiner*—Richard L. Chiesa
*Attorney, Agent, or Firm*—Kenyon & Kenyon

[57] ABSTRACT

A packing is constructed for an apparatus for mixing or for exchange processes. The packing includes at least two zig-zag layers each of which has a number of parallel rows of substantially rectangular deflecting surfaces with alternating gaps in the inclined flanks. Bridges connect the rows of deflecting surfaces and are disposed in the troughs and at the apices of the corrugated layer.

The packing can be produced by simple stamping and bending steps.

5 Claims, 5 Drawing Figures

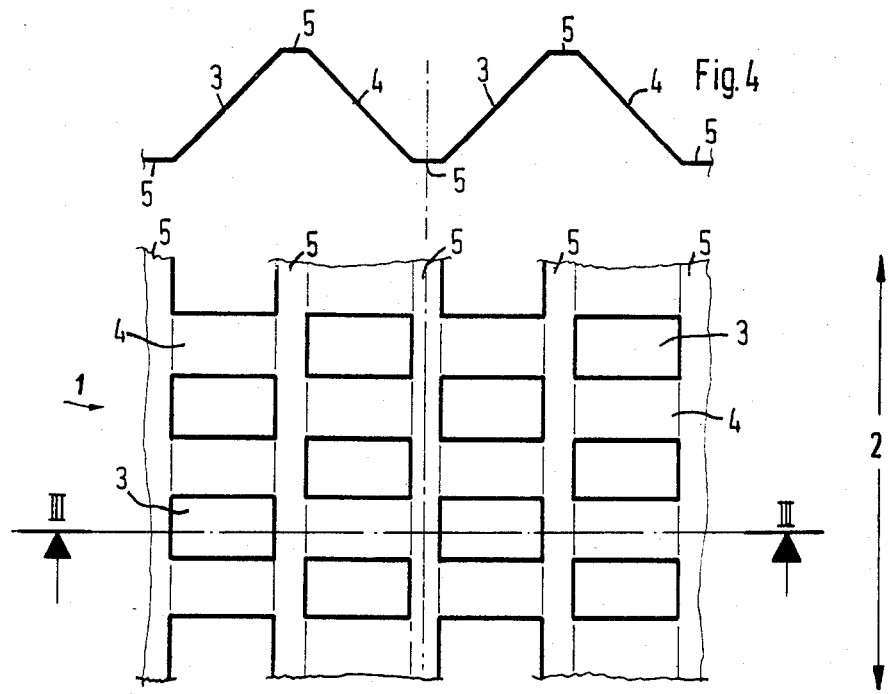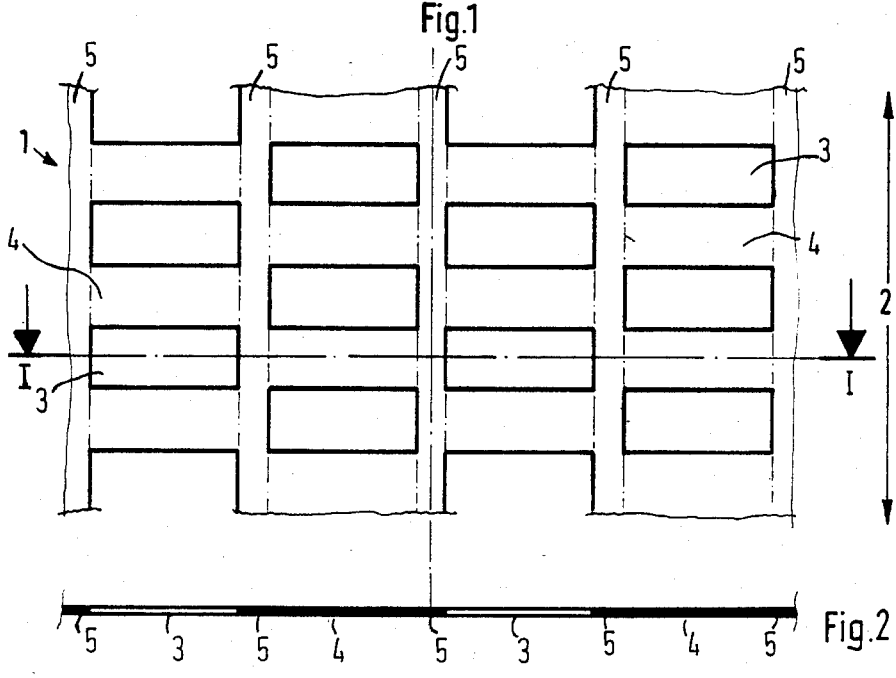

CORRUGATED SHEET PACKING AND METHOD OF MAKING

This invention relates to a packing made of corrugated sheet material and a process of making the packing.

Heretofore, various types of packings have been known for use in mass transfer, direct heat exchange and mixing. For example, various types of packings have been used in static mixers such as described in U.S. Pat. No. 4,062,524 and 4,220,416. The function of the packings in these mixers is to provide a homogeneous mixing of two or more cocurrent flows, that is, to insure good mixing of the end product over the whole flow cross-section at all quantity and viscosity ratios of the components required to be mixed.

When used in mass transfer processes, particularly for rectification, the packings are flowed through in countercurrent by the phases concerned in the mass transfer. In this case, the various surfaces of the packings serve as support surfaces for a liquid phase which trickles down as a film under gravity and with which, in the case of a gas-liquid process, a gas phase filling up the various gaps in the packing in counter-current to the liquid phase is brought into surface contact or with which, in the case of extraction columns, a second liquid phase is brought into surface contact.

However, the various packings have been constructed in manners which are very expensive, particularly in view of the wide range of diameters required for such packings. For example, U.S. Pat. No. 4,062,524 describes packings which are formed of comb-like plates which are pushed together in the shape of a cross. U.S. Pat. No. 4,220,416 describes packings which consist of joined-together discrete elements in the form of "Spanish riders". In each case, the packings require special stamping tools for each diameter.

Accordingly, it is an object of the invention to provide a packing which is simple and inexpensive to produce for any required diameter.

It is another object of the invention to provide a packing element which can be made in a relatively simple manner for use in constructing a packing.

Briefly, the invention provides a packing which is comprised of a plurality of layers which define crossing deflecting surfaces which are disposed at an inclination to a given flow direction therethrough. Each layer is of zig-zag shape defining a plurality of flanks with alternating troughs and apices. In addition, each layer has a plurality of contiguous longitudinal rows of alternating deflecting surfaces and gaps as well as a plurality of longitudinal bridges connecting the rows of deflecting surfaces and gaps. The deflecting surfaces and gaps are disposed in the flanks of the shaped packing while the bridges are alternately disposed in the troughs and apices of the layer.

In forming a packing, at least two of the layers are disposed one above the other to define crossing flow channels.

The packing may comprise a number of groups of two or more layers which are disposed one on another, for example being placed adjacent to one another in segment-wise relation. Further, the contour of the packing or of the various layers can be adapted to the inner periphery of an apparatus in which the packing is used.

If the base material used for the packing is sheet metal, the gaps are conveniently stamped out. However, if the base material is plastics, each layer can be produced by injection molding.

The invention also provides a flat one-piece bendable body for making a packing layer which is formed with longitudinal rows of alternating deflecting surfaces and gaps as well as a plurality of longitudinally disposed bridges which interconnect the rows. The body is dimensioned so as to be shaped into a corrugated layer having a zig-zag shape defining a plurality of inclined flanks in which the rows of deflecting surfaces and gaps are disposed and alternating troughs and apices connecting the flanks in which the bridges are disposed.

These and other objects and advantages of the invention will become more apparent from the following detailed description taken in conjunction with the accompanying drawings wherein:

FIG. 1 illustrates a plan view of a part of a stamped out body constructed in accordance with the invention;

FIG. 2 illustrates a view taken on line I—I of FIG. 1;

FIG. 3 illustrates a view of the body of FIG. 1 formed into a corrugated layer in accordance with the invention;

FIG. 4 illustrates a view taken on line III—III of FIG. 3;

Figure 5:
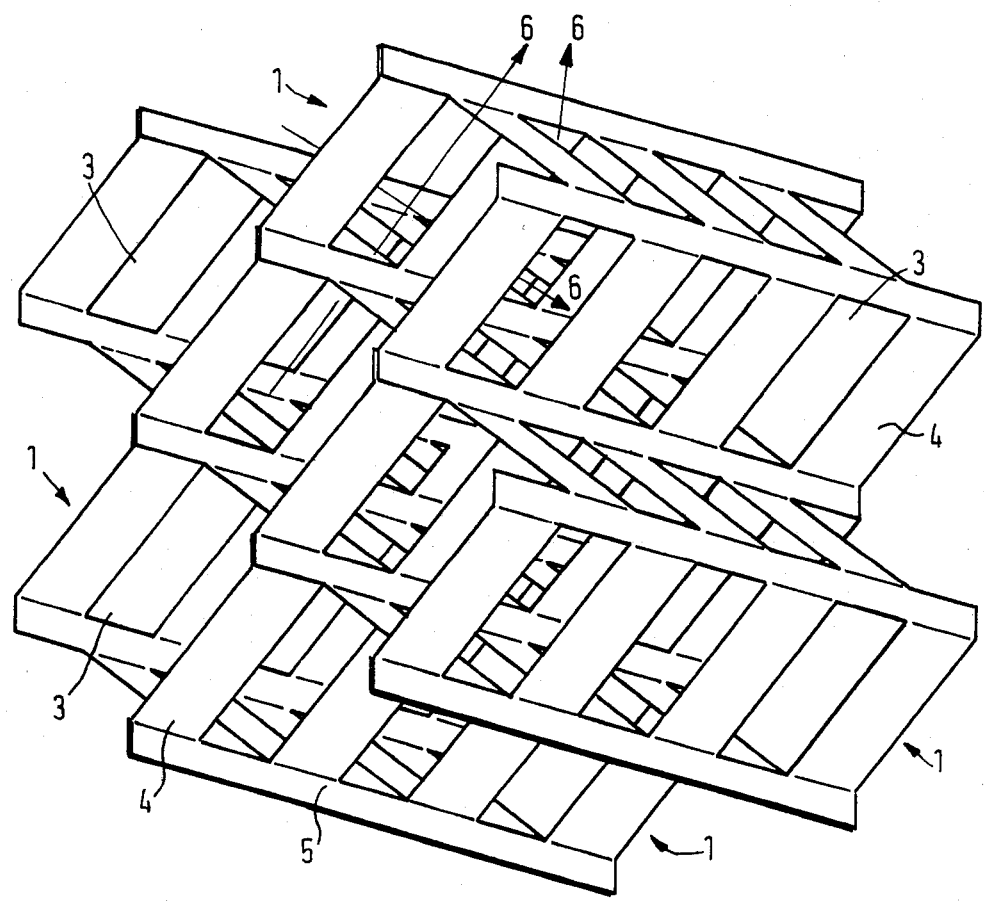
FIG. 5 illustrates a perspective view of a part of a four-layer packing constructed in accordance with the invention.

Referring to FIG. 1, a flat one-piece body 1 made of sheet metal is provided with a plurality of longitudinal rows 2 of alternating gaps 3 and deflecting surfaces 4. In addition, the body 1 is provided with a plurality of longitudinally disposed bridges 5 which interconnect the rows 2 of deflecting surfaces 4. As indicated, the deflecting surfaces 4 of each row 2 are of the same transverse width as the gaps 3 in the row 2. In addition, each deflecting surface 4 and gap 3 is of rectangular shape. Alternatively, the gaps 3 can be of other shapes, for example, the corners of the gaps 3 can be beveled so that the connecting bridges are formed between the deflecting surfaces 4.

As indicated in FIG. 1, the deflecting surfaces 4 of adjacent rows 2 are offset from one another by the width of one deflecting surface 4 and are interconnected at both ends by the connecting bridges 5.

Referring to FIGS. 3 and 4, the flat body 1 is shaped into a corrugated layer such that the rows 2 of deflecting surfaces 4 and gaps 5 are disposed in and across the inclined flanks of the layer while the connecting bridges 5 are disposed at alternating troughs and apices of the corrugated layer. As indicated, each bridge 5 is located between a gap 3 and a deflecting surface 4 of adjacent longitudinal rows 2.

Referring to FIG. 5, in order to form a packing a plurality of the corrugated layers, for example, four layers, are so assembled in tiered relation that continuous crossing channels 6 are formed. As shown, each layer 1 is disposed relative to an adjacent layer 1 so as to position the deflecting surfaces 4 of the respective layers in the planes of the deflecting surfaces 4 of the adjacent layer 1 to define the crossing flow channels therebetween. Alternatively, the deflecting surfaces 4 can be disposed in the planes of the gaps 3 of the adjacent packing to define non-continuous flow channels.

In order to hold the layers together in a unit, the various layers can be joined together along the connecting bridges 5, for example by welding. When the packing is placed, for example in a column, the deflecting surfaces 4 of each layer 1 are disposed at an inclination to a given flow direction through the packing. In addition, the packing is shaped to the contour of the column or other enclosure in which the packing is to be mounted.

Of note, the layers 1 for the packing can be made of any other suitable material. For example, the layers 1 can be made of plastics, in which case the corrugated layers can be injection molded.

The invention thus provides a packing which can be made of relatively simple parts in a simple expeditious manner. The packings which are formed can be used for mixing two or more cocurrent flows or for placing two or more media in contact in a countercurrent relation.

What is claimed is:

1. A packing comprising a plurality of layers defining crossing deflecting surfaces disposed at an inclination to a given flow direction therethrough, each said layer being of zig-zag shape defining a plurality of flanks with alternating troughs and apices and having a plurality of longitudinal rows of alternating deflecting surfaces and gaps and a plurality of longitudinal bridges connecting said rows of deflecting surfaces; said deflecting surfaces and gaps being disposed in and across said flanks and said bridges being alternately in said troughs and said apices between a respective gap and a transversely adjacent deflecting surface, at least two of said layers being disposed one above another to define crossing flow channels.

2. A packing as set forth in claim 1 wherein at least one layer is disposed relative to an adjacent layer to position said deflecting surfaces of said one layer in the planes of said deflecting surfaces of said adjacent layer to define continuous flow channels therebetween.

3. A packing as set forth in claim 1 wherein at least one layer is disposed relative to an adjacent layer to position said deflecting surfaces of said one layer in the planes of said gaps of said adjacent layer to define noncontinuous crossing flow channels therebetween.

4. A process of forming a multi-layer packing comprising the steps of injection molding a plastics material into a corrugated layer having a plurality of flanks with alternating troughs and apices and having a plurality of longitudinal rows of alternating deflecting surfaces and gaps in said flanks and a plurality of longitudinal bridges connecting said rows of deflecting surfaces and gaps and being disposed in said troughs and said apices between a respective gap and a transversely adjacent deflecting surface with each deflecting surface and each gap of a respective row extending across a respective flank between said bridges; and placing a plurality of said corrugated layers in contiguous relation with said layers being disposed one above the other to form a packing with flow channels.

5. A process of forming a packing comprising the steps of forming a flat sheet-like body with a plurality of longitudinal rows of alternating deflecting surfaces and gaps and a plurality of longitudinal bridges connecting said rows;

shaping said flat body into a corrugated later having said rows within inclined flanks of said shaped layer with each deflecting surface and each gap of a respective row extending across a respective flank and said bridges being disposed at alternating troughs and apices thereof between a respective gap and a transversely adjacent deflecting surface; and placing a plurality of said corrugated layers in contiguous relation with said layers being disposed one above the other to form a packing with flow channels.

* * * * *